(12) United States Patent
Janta-Polczynski et al.

(10) Patent No.: US 11,092,826 B2
(45) Date of Patent: Aug. 17, 2021

(54) MAGNETO-OPTICAL WAVEGUIDE DEVICE AND COUPLING METHODS

(71) Applicant: INTERNATIONAL BUSINESS MACHINES CORPORATION, Armonk, NY (US)

(72) Inventors: Barnim Alexander Janta-Polczynski, Shefford (CA); Francois Menard, Trois-Rivieres (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/556,577

(22) Filed: Aug. 30, 2019

(65) Prior Publication Data

US 2021/0063779 A1 Mar. 4, 2021

(51) Int. Cl.
*G02F 1/095* (2006.01)

(52) U.S. Cl.
CPC ........ *G02F 1/0955* (2013.01); *G02F 2202/30* (2013.01); *G02F 2202/36* (2013.01)

(58) Field of Classification Search
CPC .......................... G02F 1/0955; G02F 2202/30
See application file for complete search history.

(56) References Cited

U.S. PATENT DOCUMENTS

| 2002/0097946 A1* | 7/2002 | Fujita | G02F 1/0955 385/11 |
| 2003/0174956 A1* | 9/2003 | Viens | G02B 6/1228 385/43 |
| 2004/0201889 A1* | 10/2004 | Wang | B82Y 20/00 359/485.02 |
| 2005/0089263 A1* | 4/2005 | Wessel | G02F 1/0955 385/14 |
| 2009/0214885 A1* | 8/2009 | Her | C23C 16/483 428/544 |

FOREIGN PATENT DOCUMENTS

| CN | 103472598 A | 12/2013 |
| CN | 105093571 A | 11/2015 |

OTHER PUBLICATIONS

Amemiya, Tomohiro & Ishikawa, Atsushi & Shoji, Yuya & Hai, Pham & Tanaka, Masaaki & Mizumoto, T. & Tanaka, Takuo & Arai, Shigehisa. (2014). Three-dimensional Nanostructuring in YIG Ferrite with Femtosecond Laser. Optics letters. 39. 212-5. 10.1364/OL. 39.000212. (Year: 2014).*

(Continued)

*Primary Examiner* — Omar R Rojas
(74) *Attorney, Agent, or Firm* — Cantor Colburn LLP; Peter Wang

(57) ABSTRACT

A magneto-optical waveguide device includes a waveguide coupled with a magneto-optical crystal material. The magneto-optical waveguide device includes a patterned nanostructure within the magneto-optical crystal material that includes an internal optical waveguide through the magneto-optical crystal material. The patterned nanostructure modifies the refractive index of the magneto-optical crystal material below diffraction limit. The patterned nanostructure creates metamaterial effective properties that optimize core-cladding inside the magneto-optical crystal material to create the optical waveguide.

15 Claims, 13 Drawing Sheets

(56) References Cited

OTHER PUBLICATIONS

Ishikawa et al., "Optical and Magnetic Microstructures in YIG Ferrite Fabricated by Femtosecond Laser," Journal of Laser Micro/Engineering, vol. 10 No. 1, Jan. 2015. DOI: 10.2961/jlmn.2015.01.0010. pp. 48-52.

Onbasli et al., "Optical and Magneto-Optical Behavior of Cerium Yttrium Iron Garnet Thin Films at Wavelengths of 200-1770 nm," Scientific Reports, 6:23640. DOI: 10.1038/srep23640 Published Mar. 30, 2016. 10 pages.

\* cited by examiner

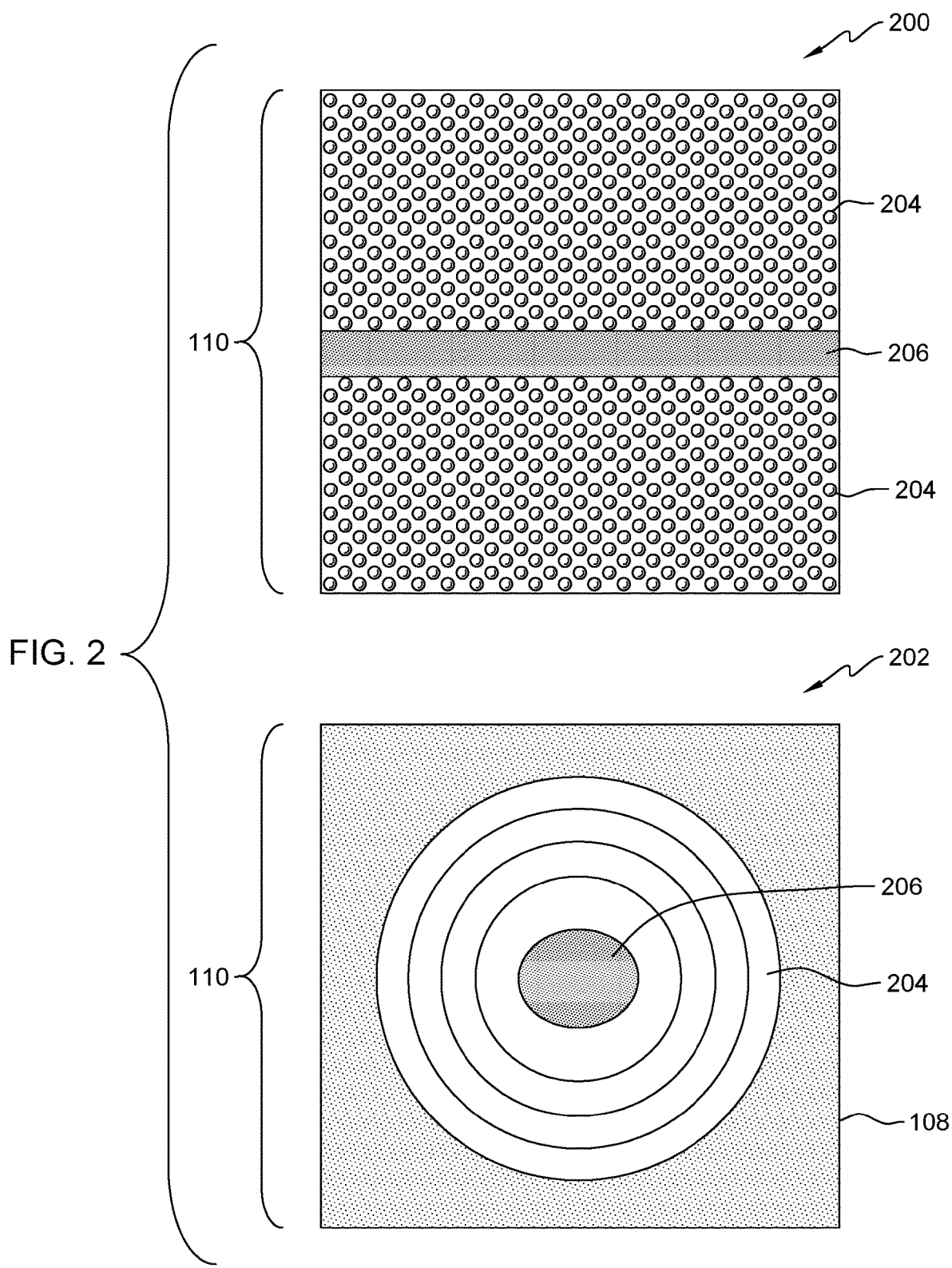

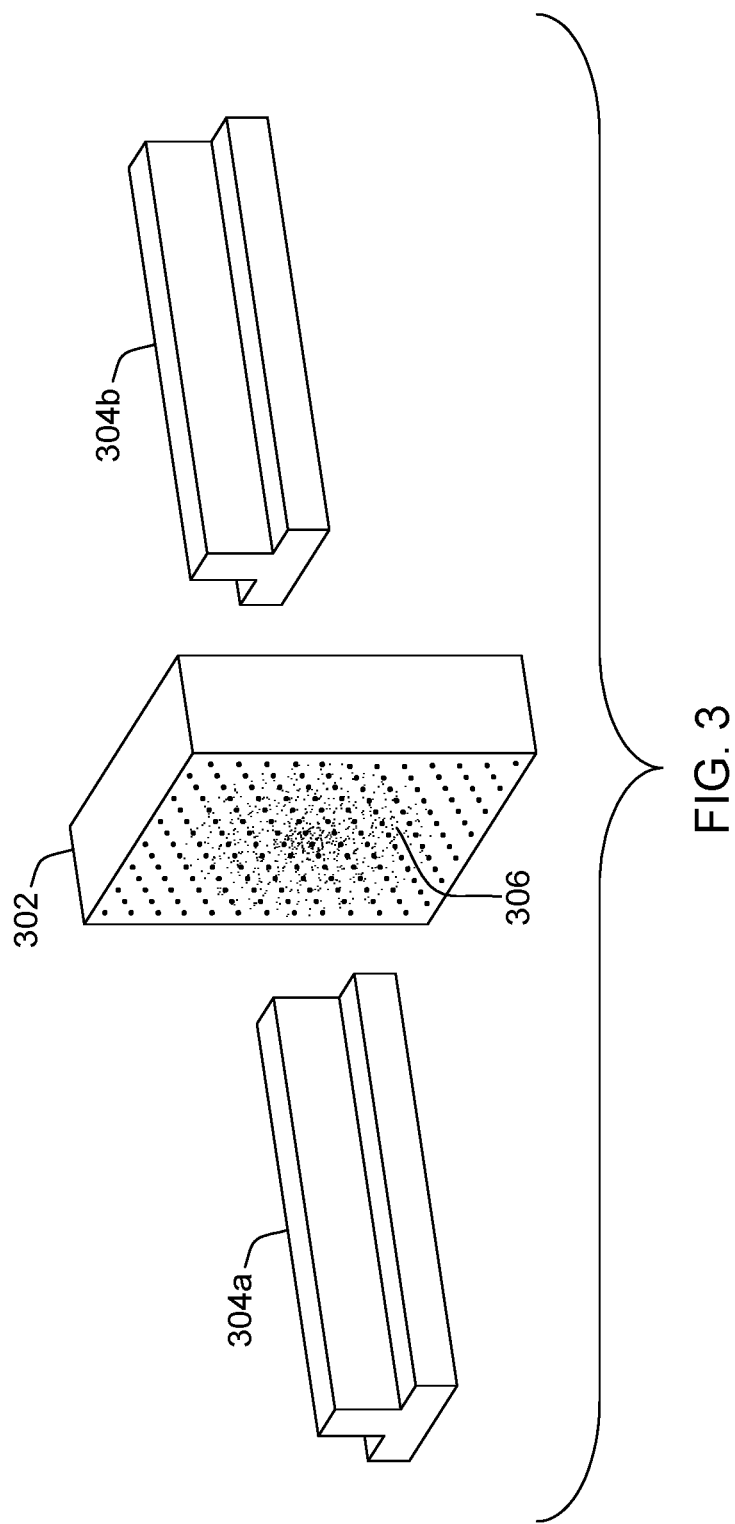

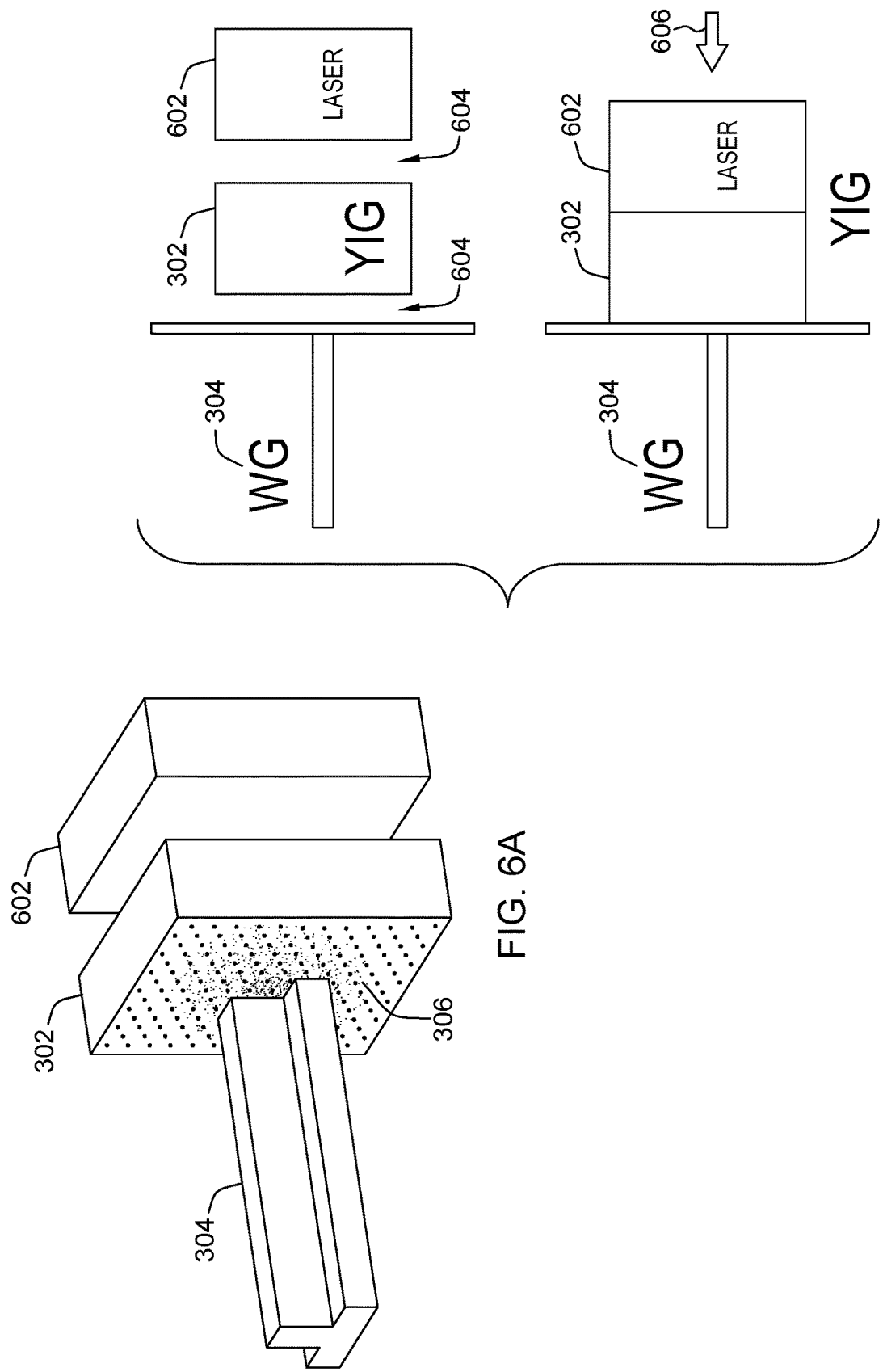

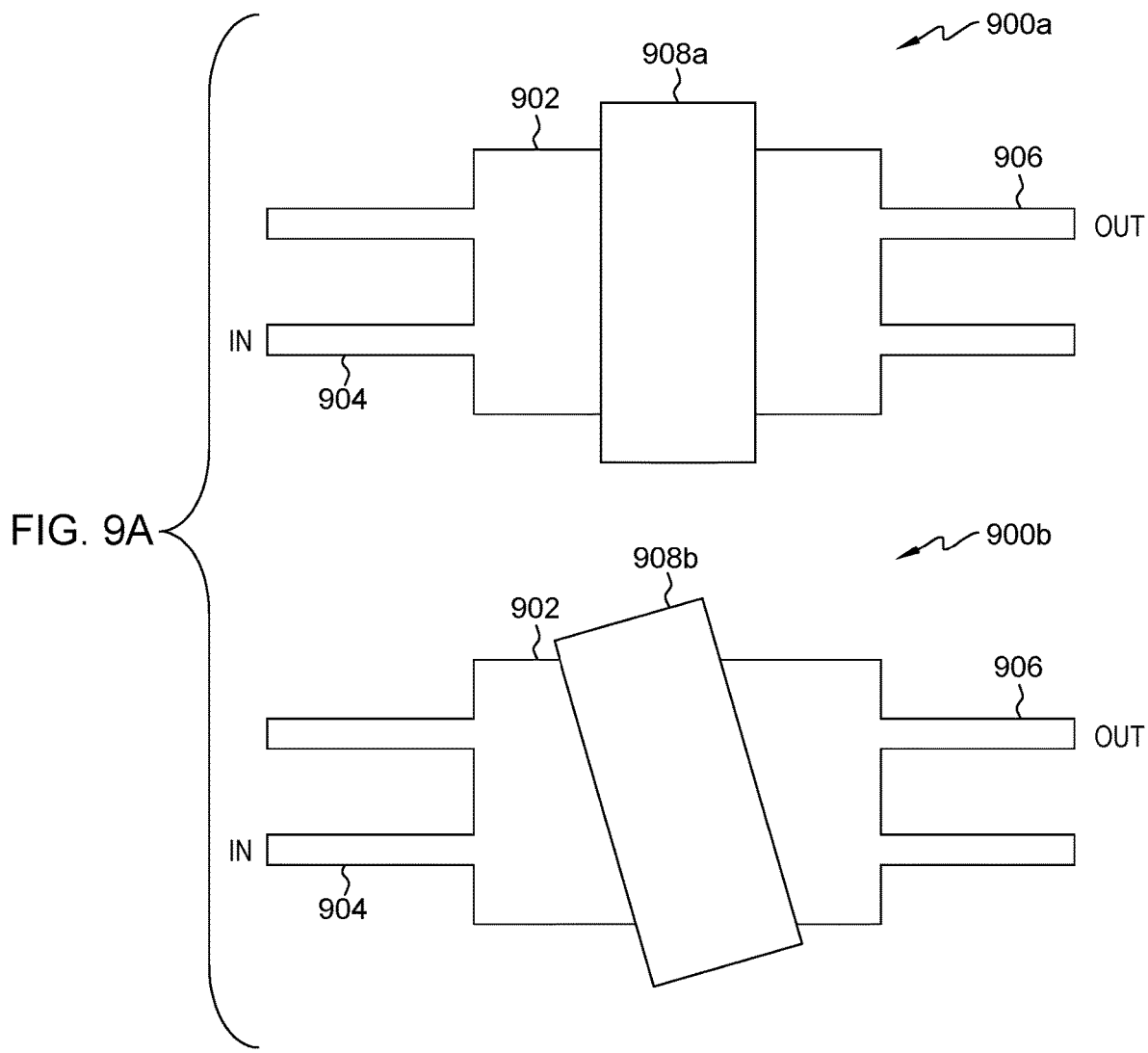

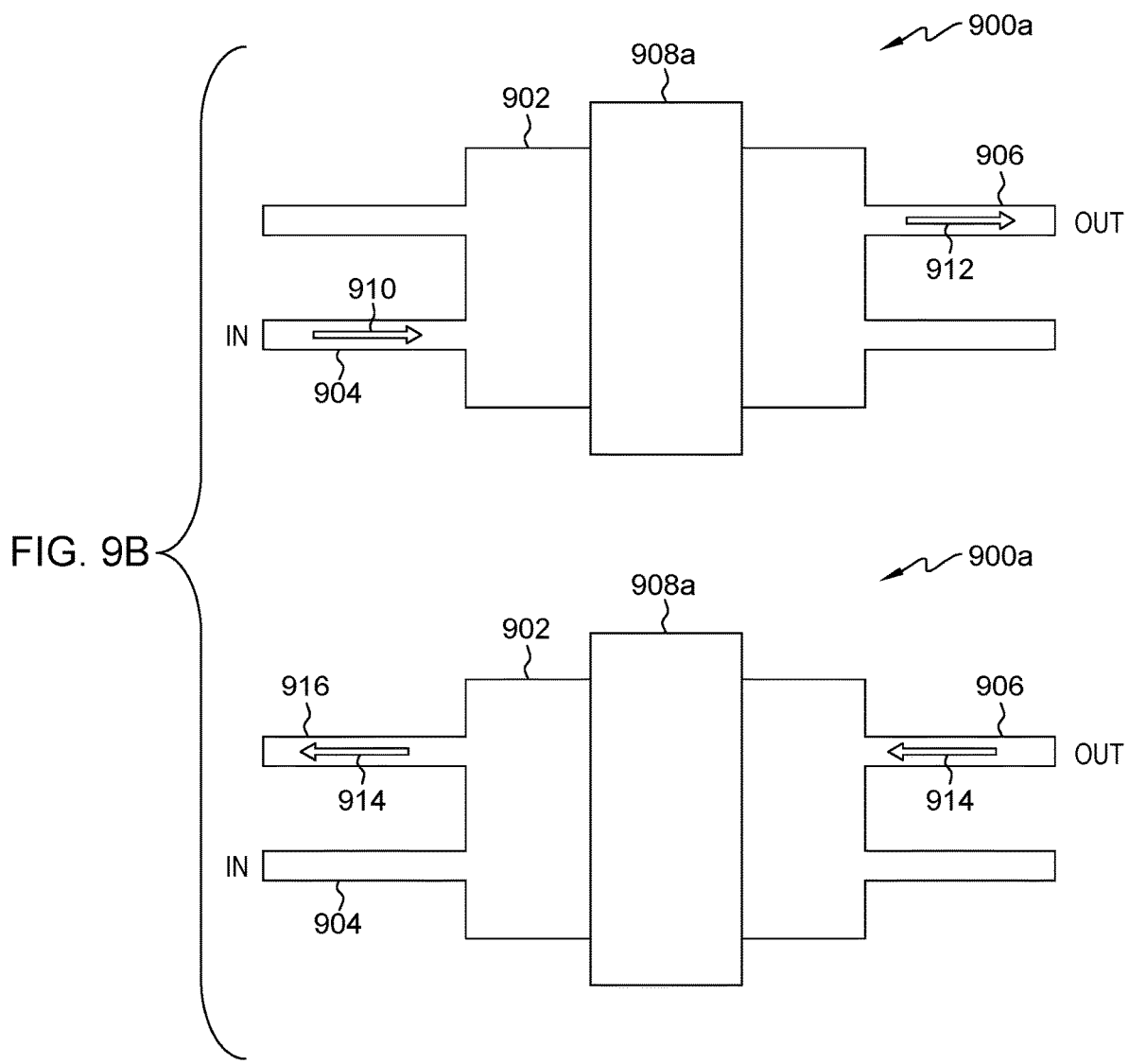

MAGNETO-OPTICAL WAVEGUIDE DEVICE AND COUPLING METHODS

BACKGROUND

The present invention relates to the field of optics, and in particular, to the implementation of a magneto-optical waveguide device, its incorporation into an integrated optical waveguide circuit, and of methods to couple light to and from such device and/or circuit.

Optical isolators and circulators are devices that allow polarized light to pass through in one direction, but not in the opposite direction (like a one-way valve). These are useful in photonic applications. For example, an isolator is placed at the outlet of a semiconductor optical amplifier or laser, allowing the light to leave structure and to prevent any back reflections from reentering the structure, in order to ensure the optical performance of the device. In an isolator, a magneto-optical crystal is used to rotate the plane of polarization of light, through a property known as Faraday rotation. The amount of rotation is a function of both the wavelength and of its propagation distance through the crystal. The direction of the rotation is a function of the direction of light through the crystal and gives rise to non-reciprocal rotation for forward and backward propagating light. The actual amount of non-reciprocal Faraday rotation required to implement an optical isolator device varies as a function of the level of isolation that is required and whether the isolator is implemented as a free space device through a focusing structure or as a waveguide device through non-reciprocal phase shift. A circulator is a more complex device containing multiple ports, usually 3, which enable light to travel in only one direction from one port to the following port.

A Photonic Integrated Circuit (PIC) is a device that integrates multiple photonic functions. The difference between the PIC and an IC is that the PIC process signals are imposed on optical beams while IC process signals are imposed on electrical currents or voltages. These optical beams typically have wavelengths ranging from the UV/visible spectrum (200-750 nm) to near Infrared spectrum (750 nm-1650 nm). The PIC can also be interchangeably referred to as an integrated optical circuit. The materials used for the fabrication of PICs include, but are not limited to, silica (SiO2) on silicon, silicon on insulator (SOI), various polymers and compound semiconductor materials such as GaAs, InP, and GaN.

However, conventional free-space bulk magneto-optical isolators and circulators are incapable of guiding light under total internal reflection. Therefore, the coupling of such conventional isolators with integrated waveguides, which may be formed from silicon or silicon/nitride materials, require complex mode conversion structures and collimation lenses. This renders integration and packaging of conventional magneto-optical isolators and circulators with photonic integrated circuits costly.

A waveguide device inherently compatible with light coupling methods used in integrated optics would make it possible to add optical isolators and circulators to photonic integrated circuits without resorting to conventional free space optics coupling techniques.

SUMMARY

Embodiments of the present invention are directed to a magneto-optical waveguide device. A non-limiting example of the magneto-optical waveguide device includes a waveguide coupled with a magneto-optical crystal material. The magneto-optical waveguide device includes a patterned nanostructure within the magneto-optical crystal material that includes an internal optical waveguide through the magneto-optical crystal material. The patterned nanostructure modifies the refractive index of the magneto-optical crystal material below diffraction limit. The patterned nanostructure creates metamaterial effective properties that optimize core-cladding inside the magneto-optical crystal material to create the optical waveguide.

Embodiments of the present invention are directed to an integrated optical waveguide circuit. A non-limiting example of the integrated optical waveguide circuit includes an input optical waveguide, an output optical waveguide and a magneto-optical waveguide device coupled to the input optical waveguide and the output optical waveguide. The magneto-optical waveguide includes a patterned nanostructure within a magneto-optical crystal material. The magneto-optical waveguide device induces a non-reciprocal phase shift (NRPS) on optical signals traversing through the magneto-optical waveguide device and so that optical back reflections are directed by the integrated optical waveguide circuit to a port different from the input optical waveguide.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 shows a plurality of nano studs formed in the magneto-optic crystal material to create new material properties, according to an embodiment of the invention;

FIG. 3 shows a magneto-optical waveguide device that is patterned to achieve a cladding condition metamaterial, in accordance with embodiments of the present invention;

FIGS. 6A and 6B show coupling of the magneto-optical waveguide device of FIG. 3 with amplification medium and external waveguide, in accordance with embodiments of the present invention;

FIGS. 9A and 9B show integrated optical waveguide circuits based on defocusing optical back reflections, in accordance with embodiments of the present invention.

Figure 1A:
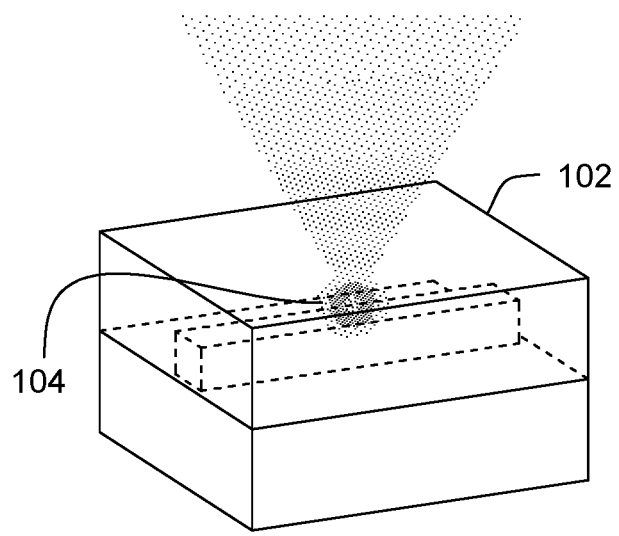
FIGS. 1A-1B show the procedure for creating a pattern in magneto-optic crystal material using pulsed laser ablation, in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Semiconductor laser diodes, as coherent light sources, have been adopted for a large variety of different applications in a remarkably short amount of time. For example, they may be used in various telecommunication and data communication devices to transmit optical signals. Compound semiconductors such as indium phosphide, gallium arsenide, and related ternary and quaternary materials have been important for optical communications, and in particular light emitting devices and photodiodes, because of their direct energy bandgap. At the same time, integration of advanced electrical functions on these materials has been limited to niche, high-performance applications due to the much higher cost of fabricating devices and circuits in these materials.

Generally, diode lasers have the advantage of being compact, highly efficient, direct emitters that can be frequency-tuned via temperature and current. Diode lasers have several additional characteristics. Firstly, diode lasers may be readily obtained in standard packages that include an integrated optical isolator and an integrated polarization-maintaining (PM) optical fiber (a so-called "pigtail") as an output. Having an optical isolator positioned close to the output facet of the diode laser emitter as provided in various standard packages helps to keep the diode laser's output intensity and frequency stable and resistant to disruption from optical back reflections coming from downstream optical surfaces. The integrated PM fiber pigtail is useful for easy coupling to downstream optical components. Secondly, many readily available laser packages include a wavelength selection element (e.g., volume grating, aka volume Bragg grating) to stabilize and narrow the laser's output wavelength. Alternately, the diode laser can be provided as a distributed-feedback (DFB) laser diode in which the device has a built-in periodic structure that acts to stabilize and narrow the laser's output wavelength. Alternatively, the diode laser can be a distributed-Bragg-reflector (DBR) laser diode, which consists of a laser diode that is sandwiched between two Bragg reflector structures—in this case, the Bragg structures also act to stabilize and narrow the laser's output wavelength. Yet a third advantage is that the emission wavelength of a diode laser can easily be tuned, within limits, by either temperature or current control.

As noted above, an optical isolator is a device that allows light to pass through in one direction, but not in the opposite direction (like a one-way valve). An optical isolator may be placed at the outlet of a laser, allowing the light to leave the laser, but not to reenter it, which would make the laser unstable. An optical isolator is typically used to prevent unwanted feedback into an optical oscillator, such as a laser cavity. An optical isolator uses Faraday effect to mitigate unwanted back reflections into the laser cavity. In optical fiber communication systems, polarization-insensitive fiber-coupled optical isolators may be used before and after any fiber amplifier, for example. In large-capacity, high-speed and long-distance optical communication systems, the optical isolator is one of the key devices for stable laser diode operation. In high-speed laser direct-modulation, the aforementioned back reflections can also cause signal degradation and noise induction. Thus, in such systems the optical isolator is one of the key devices that provides stable laser diode operation. Optical isolators typically use collimating light. One option for collimating light is to use a lens mounted directly to an optical isolator. As another non-limiting example, in optical communication systems that utilize bidirectional optical fibers the same fiber is shared for transmission and reception purposes. In such systems back reflection can pollute signals and optical isolators may provide signal isolation required to reduce the reflective effect.

As noted above, a PIC is a device that integrates multiple photonic functions. The difference between the PIC and an IC is that the PIC can also process optical signals. Conventional bulk magneto-optical isolators do not guide light and are therefore inherently incompatible with submicron wire waveguides, which may be formed from silicon or silicon/nitride materials, without the use of free space optics, complex mode conversion and collimation lenses. This renders integration and packaging of conventional magneto-optical isolators with PICs costly and impractical.

Various embodiments of the present invention enable the use of magneto-optical isolator devices in integrated optic circuits waveguides to inhibit system-level effects of optical feedback. Moreover, the disclosed approach enables the integrated circuit to utilize the Faraday effect in magneto-optical isolator devices without any free space optics.

Figure 1B:
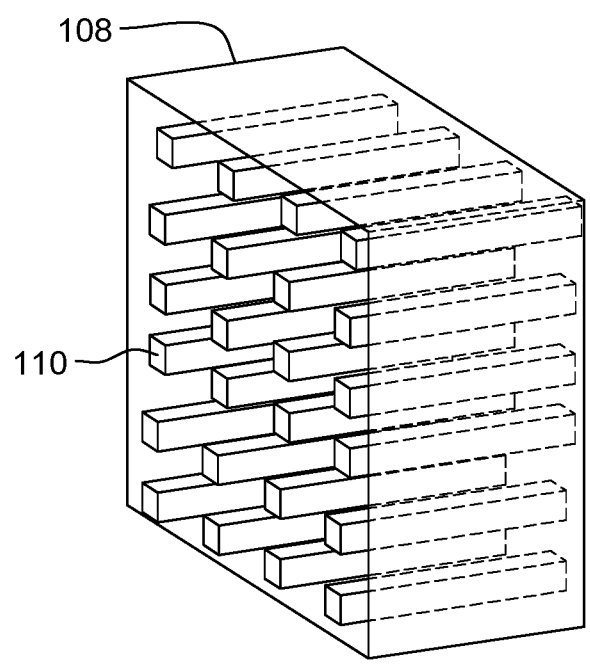

FIGS. 1A and 1B show the procedure for creating a pattern in magneto-optic crystal material using pulsed laser, as focus a beam, in accordance with embodiments of the present invention. In one embodiment, laser is used to perform laser modification of the refractive index of the magneto-optic materials 102. According to embodiments of the present invention, a pattern modification of the refractive index under the diffraction limit creates adjustable metamaterial that can be optimized to create a core and cladding condition of a waveguide inside the magneto-optic crystal. The waveguide guiding conditions can be changed to create mode couplers or mode converters In one non-limiting embodiment, a pulsed laser 104 shown in FIG. 1A can be a femtosecond laser. Femtosecond lasers offer several unique advantages over lasers of longer pulse duration. In particular, their ultrashort pulse duration makes it possible to produce extremely high target intensities with relatively low pulse energy. The high target intensities, in conjunction with ultrashort pulse duration, and interferometric patterning enable precise micron or submicron level materials processing with minimal and/or manageable heat transfer to the target material per pulse. It is possible to take unique advantage of this latter property by controlling the rate and the projected pattern of laser impact upon the target material.

In various embodiments, magneto-optic crystal materials 102 with patterned modification of the refractive index under the diffraction limit creates a metamaterial, that implies an effective refractive index that results from the patterned modification. According to embodiments of the present invention, laser irradiation locally increases the refractive index (n) by about 0.7% and changes the magnetic properties from hard to soft. In other words, laser ablation creates areas with alternating refractive index inside photonic crystals 102.

According to an embodiment of the present invention, by focusing femtosecond laser pulse of a pattern below diffraction limit, a metamaterial nanostructure 110 shown in FIG. 1B is created that changes the magnetic properties of the magneto-optic material 108. Since focal point of a laser beam can be adjusted to varying depths, the created metamaterial nanostructure 110 can be a three-dimensional (3D) structure and can vary to emphasize birefringence or mode coupling by grated-index change in the 3D structure. In one embodiment, a pulse of the laser may create ablated holes as the pattern that is filled with air within the magneto-optical material 108. As noted above, the metamaterial nanostructure 110 creates areas with alternating refractive index (refractive index of the unperturbed magneto-optic material 108 vs. refractive index of the laser modified magneto-optic material). In other words, the metamaterial nanostructure 110 represents a ring of decreased refractive index by the patterning process.

Generally, metamaterials are artificial structures composed of tailored sub-wavelength building blocks. Metamaterials are found able to greatly improve the capabilities to manipulate electromagnetic radiation almost throughout the entire spectrum, providing many intriguing properties and phenomena, such as modified refractive index n, superlensing, and invisibility.

FIG. 2 shows a plurality of nano studs formed in magneto-optic crystal material to create new material properties, according to an embodiment of the invention. FIG. 2 illustrates that various embodiments of the present invention utilize various permutations within magneto-optical material 108 to create new material properties. It should be noted that a formed plurality of nano studs 204 is similar in structure to fiber Bragg gratings (FBGs). An FBG is a Bragg grating formed in an optical fiber. FBGs may be formed from photo-imprinted gratings in optical fibers. Photo-imprinting involves the irradiation of an optical waveguide with a laser beam of ultraviolet light to change the refractive index of the core of the waveguide. By irradiating the fiber with an intensive pattern that has a periodic (or aperiodic) distribution, a corresponding index perturbation is permanently induced to the waveguide. The result is an index grating that is photo-imprinted in the optical waveguide.

Generally, in photonic crystals, a periodic lattice of contrasting dielectric structures (i.e., different indices of refraction) provides the periodic potential for light that atoms do for electrons. Photonic crystals can be thought of as extensions of diffraction gratings (i.e., a one-dimensional photonic crystal). Light interacting with a diffraction grating interacts with the periodic structure and is redistributed into "allowed" and precluded from "forbidden" directions. The forbidden directions are the "photonic bandgaps" of the structure.

Photonic crystals can be designed with photonic bandgaps that prevent light of a certain wavelength and direction from propagating within the photonic crystal. Inversely, a photonic crystal can be designed to guide certain wavelength. According to embodiments of the present invention, different laser irradiation techniques can be used to reach different guiding condition. FIG. 2 shows a side view 200 and a front view 202 of a one-dimensional nanostructure 110. The one-dimensional nanostructure 110 is similar to a photonic crystal having a one-dimensional periodic structure. In one embodiment, a laser pulse is used to modify the refractive index of the patterned nanostructure 110 while the core 206 in the center of the patterned nanostructure 110 keeps it's Verdet constant for the magneto-optical waveguide device. The Verdet constant is equal to the angle of rotation of plane-polarized light in a substance with an applied magnetic field divided by the product of the length of the light path in the substance and the strength of the applied magnetic field and is a function of both temperature and wavelength of the light signal. Advantageously, the metamaterial nanostructure 110 creates light guiding (waveguide) conditions. More specifically, the patterned nanostructure 110 optimizes core-cladding conditions with grated-index effective metamaterial refractive index inside the magneto-optic material 108 to create an optical waveguide.

The nanostructure 110 having a plurality of nano studs 204 formed in isolator material 108 is similar to a photonic crystal having a one-dimensional periodic structure. The generated nanostructure 110 is patterned so that it has desirable metamaterial properties, such as a cladding condition described below. In various embodiments, each created nanostructure can be characterized by different refractive index contrast. However, in most embodiments, it may be sufficient to have a relatively low refractive index contrast (e.g., below 1%). Generally, the greater the differential is in refractive indices the more light will be confined within the nanostructure 110.

The magneto-optical waveguide device contemplated by various embodiments of the present invention utilizes pattern modification to configure metamaterial of a magneto-optic photonic crystal to create an internal optical waveguide within the magneto-optic crystal of the device. In some exemplary embodiments, a magneto-optical waveguide device may also function as a mode converter, as described below. In such embodiments, the generated nanostructures 110 can be patterned to provide such mode conversion functionality.

FIG. 3 shows a magneto-optical waveguide that is patterned to achieve cladding condition metamaterial, in accordance with embodiments of the present invention. In one embodiment a magneto-optical waveguide device integrates magneto-optic materials with large Faraday rotation to create a waveguide optical circuit. Such magneto-optic materials may include cerium substituted yttrium iron garnet (Ce:YIG). In other words, an optical isolator device may be formed by growing a Ce:YIG layer (nCeYIG=2.22) on a (Ca, Mg, Zr)-substituted gadolinium gallium garnet (SGGG) substrate (nSGG=2.22). The SGGG is the preferred native substrate for Ce:YIG layer due to lattice matching. All materials are low loss at λ=1550 nm, with the exception of the Ce:YIG which has a propagation loss of about 60 dB/cm, included in the mode analysis.

In one embodiment, the magneto-optical waveguide device 302 may include metamaterial elements that are embedded within the magneto-optical waveguide device 302; for example, the metamaterial elements can include patterned metamaterial nanostructures 110 such as those presented in FIG. 2. Because this pattern of elements is adjustable, some embodiments of the magneto-optical waveguide device 302 may have a particular pattern of the metamaterial elements that is selected according to principles of intended functionality of the device (e.g., waveguide device versus waveguide device with an internal mode converter, and the like). In one embodiment, the metamaterial elements create a core region of magneto-optical crystal material and a cladding region 306 or cladding layer of metamaterial on at least one face or edge of the core region. A refractive index of the cladding region 306 is less than the refractive index of the core region. In other words, the magneto-optical waveguide device 302 preferably exhibits a double refraction phenomenon called birefringence, in which the crystal behaves as though it has different velocities of propagation for light waves of different polarizations. The birefringent effect in the crystal is adjustable by changing patterns (nanomaterial properties) within the magneto-optical waveguide device 302.

It should be noted that conventional optical fibers have a solid cross-section and are made of fused silica, with the core region and the cladding region having different indices of refraction. The cladding region may have a refractive index that ranges from 0.1% (single-mode fibers) to 2% (multi-mode fibers) less than the refractive index of the core, which itself usually has a nominal refractive index of 1.47. According to embodiments of the present invention, just like in optical fibers, because of the difference in refractive indices between core region and cladding region, the magneto-optical waveguide device 302 is capable of confining light that is axially introduced into the core region. At least in some embodiments, this light can be introduced by an external waveguide device 304. In one embodiment, two different waveguides can be coupled to opposing edges of the magneto-optical waveguide device 302. In such configuration, a first external waveguide device 304a is an input device introducing light into the magneto-optical waveguide device 302, while a second external waveguide device 304b is an output device receiving light transmitted through the magneto-optical waveguide device 302. In other words, when light propagates in a first direction from the first external waveguide 304a to the second external waveguide 304b, the light is focused into a guided mode of the second external waveguide 304b and when light propagates in a second direction from the second external waveguide 304b to the first external waveguide 304a, the light is no longer coupled to the guided mode back in the first external waveguide 304a.

Each of the external waveguide device 304a-304b can be a single-mode or multi-mode waveguide having rectangular, rib, ridge, strip, or wire geometry having a width between approximately 100 nm to 30 μm, and a height between approximately 100 nm to 15 μm. The waveguide device 304a-304b can be formed from a substantially transparent material such as, for example, Si, $Si_3N_4$, SiC, SiGe, SiON, $SiO_2$, SiCN, GaAs, InP, InGaAsP, or GaN. The refractive index of the waveguide devices 304a-304b is, for example, between approximately 1.30 to 3.5. In some embodiments, each of the external waveguide devices 304a-304b may have optical mode converter portions.

Figure 5:
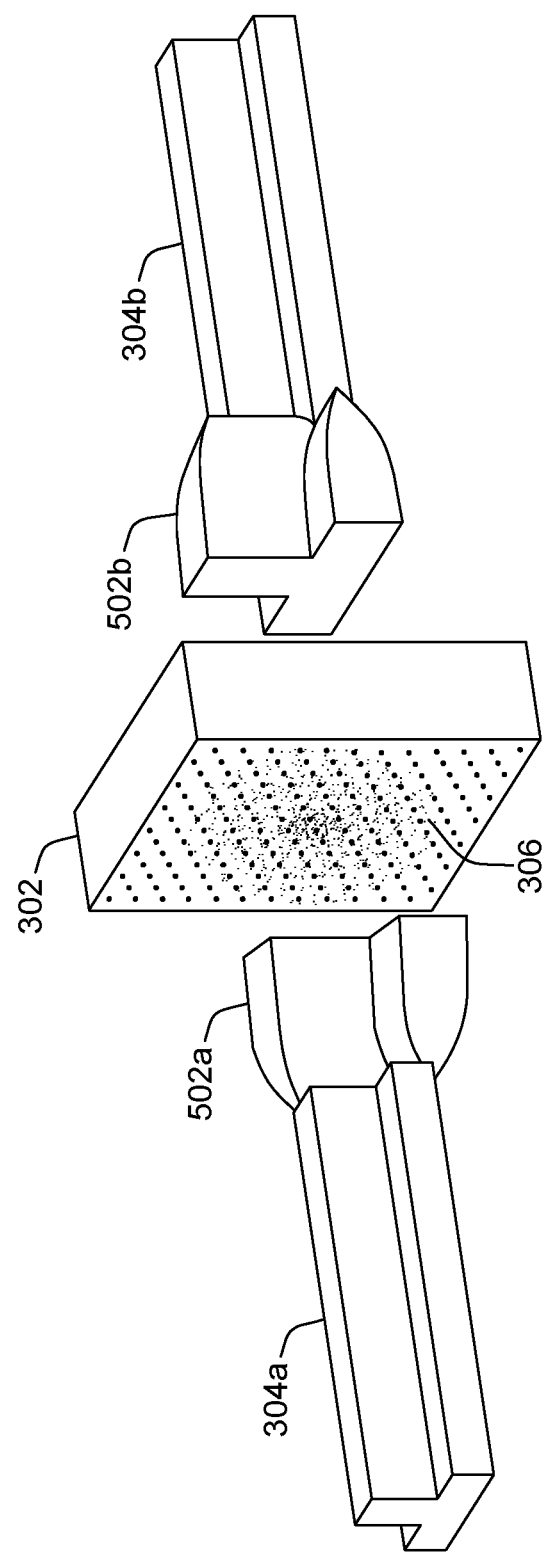
FIG. 5 shows integration of optical mode converters to couple the magneto-optical waveguide device of FIG. 3 with external waveguides, in accordance with embodiments of the present invention.

FIG. 5 shows integration of the magneto-optical waveguide device of FIG. 3 with external waveguides having optical mode converter portions, in accordance with embodiments of the present invention. In the illustrated embodiment, the first waveguide device 304a includes a first optical mode converter portion 502a arranged at one end of the first waveguide device 304a and the second waveguide device 304b includes a second optical mode converter portion 502b arranged at one end of the second waveguide device 304b.

In the illustrated embodiment, the first optical mode converter portion 502a and the second optical mode converter portion 502b are sized and shaped to provide a butt-coupling arrangement between the respective ends of the first waveguide device 304a and the second waveguide device 304b and the opposing surfaces of the magneto-optical waveguide device 302 that matches the mode profile(s) of the external waveguide devices 304. In one embodiment, the interface between the illustrated waveguide device 304 and the magneto-optical waveguide device 302 is perpendicular to the axis of each external waveguide device 304. Alternatively, the interface may be tilted at an angle less than 90 degrees to reduce the light reflections at the interface.

At least in some embodiments, the first optical mode converter portion 502a and the second optical mode converter portion 502b may have tapered mode profiles. For example, the width of the optical mode converter portion 502a portion tapers the mode field towards the end of the corresponding magneto-optical waveguide device 302. It should be noted that in FIG. 5, the magneto-optical waveguide device 302 may have additional internal mode converter regions at corresponding interfaces that facilitate coupling of the magneto-optical waveguide device 302 to the external waveguides 304.

Figure 4:
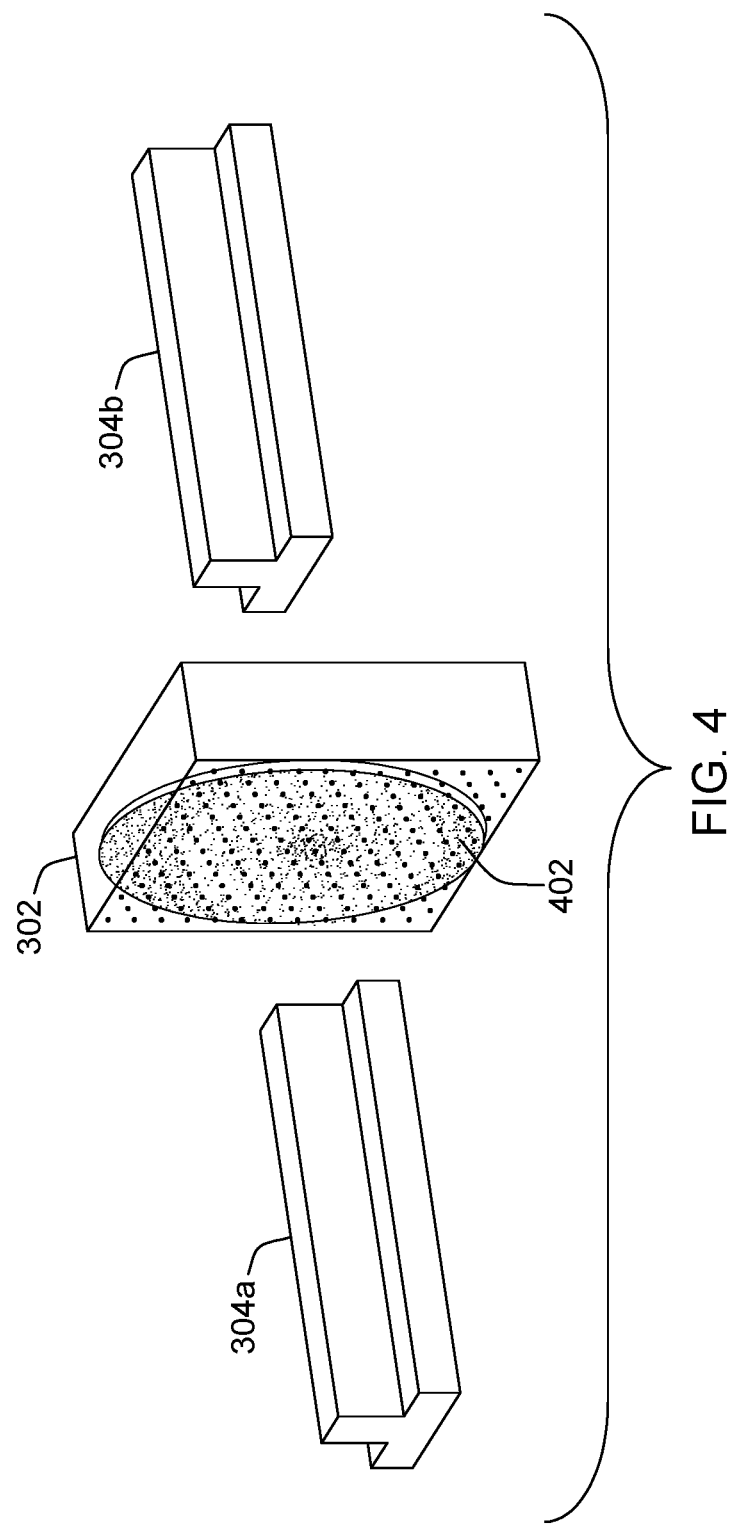
FIG. 4 shows modification of an edge of the magneto-optical waveguide device of FIG. 3 to create a gradient-index lens effect, in accordance with embodiments of the present invention.

FIG. 4 shows a modification of an edge of the magneto-optical waveguide device of FIG. 3 to create an internal mode converter region by changing the pattern nanostructure 110, in accordance with embodiments of the present invention. As shown in FIG. 3, the magneto-optical waveguide device 302 may include a cladding region 306. In the embodiment illustrated in FIG. 4, a layer of the cladding region closest to the corresponding surface of the magneto-optical waveguide device 302 may be modified further to create a phenomenon called grated-index lensing effect to optimize the coupling to the magneto-optical waveguide device 302. This layer of the cladding region creates an internal mode converter region 402. In one embodiment, an optical adhesive material may be used for the purpose of bonding the magneto-optical waveguide device 302 to the external waveguide device 304. At least in some embodiments, a multilayer (three or more optical layer) may be used that includes layers of materials having indices of refraction that increase across the composite, e.g., monotonically. Three or more adhesive layers may be included in the multilayer adhesive, especially at outer layers, e.g., to bond to optical components. Adhesive layers can also be included in the multilayer optical adhesive.

FIGS. 6A and 6B show coupling of the magneto-optical waveguide device of FIG. 3 with amplification medium and external waveguide, in accordance with embodiments of the present invention. In other words, FIGS. 6A and 6B illustrate one practical application of the magneto-optical waveguide device 302 of FIG. 3. In this example, the magneto-optical waveguide device 302 is situated between the external waveguide device 302 and some type of amplification medium. In some embodiments, the external waveguide may include optical mode converter portion 502 (not shown in FIG. 6A). The amplification medium may include any type of optical amplifier for amplifying a signal light in an optical communication system. In one embodiment, the amplification medium may include a laser 602, such as a diode laser emitter, for example.

The magneto-optical waveguide device 302 includes a patterned nanostructure that creates a guiding condition to guide the light from the laser 602 towards the external waveguide device 304. In various embodiments, the magneto-optical waveguide device 302 may perform a function of beam expander lens, beam profile converter, mode converter and the like. As shown in FIG. 6B, the laser 602 can be pushed 606 to close the gap 604 between the laser 602 and the magneto-optical waveguide device 302.

Figure 7A:
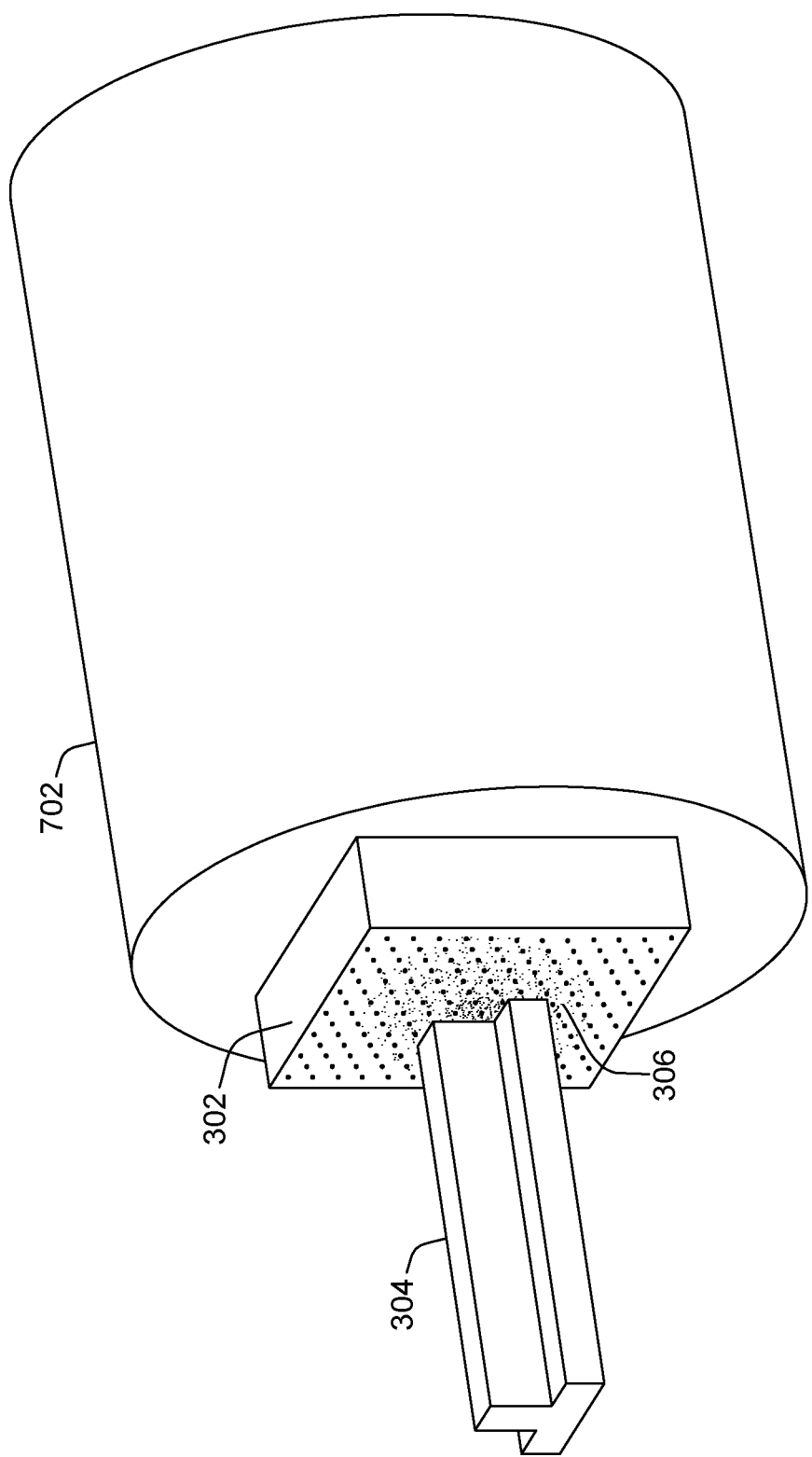
FIGS. 7A and 7B show coupling of the magneto-optical waveguide device of FIG. 3 with an optical fiber and external waveguide, in accordance with embodiments of the present invention.
Figure 7B:
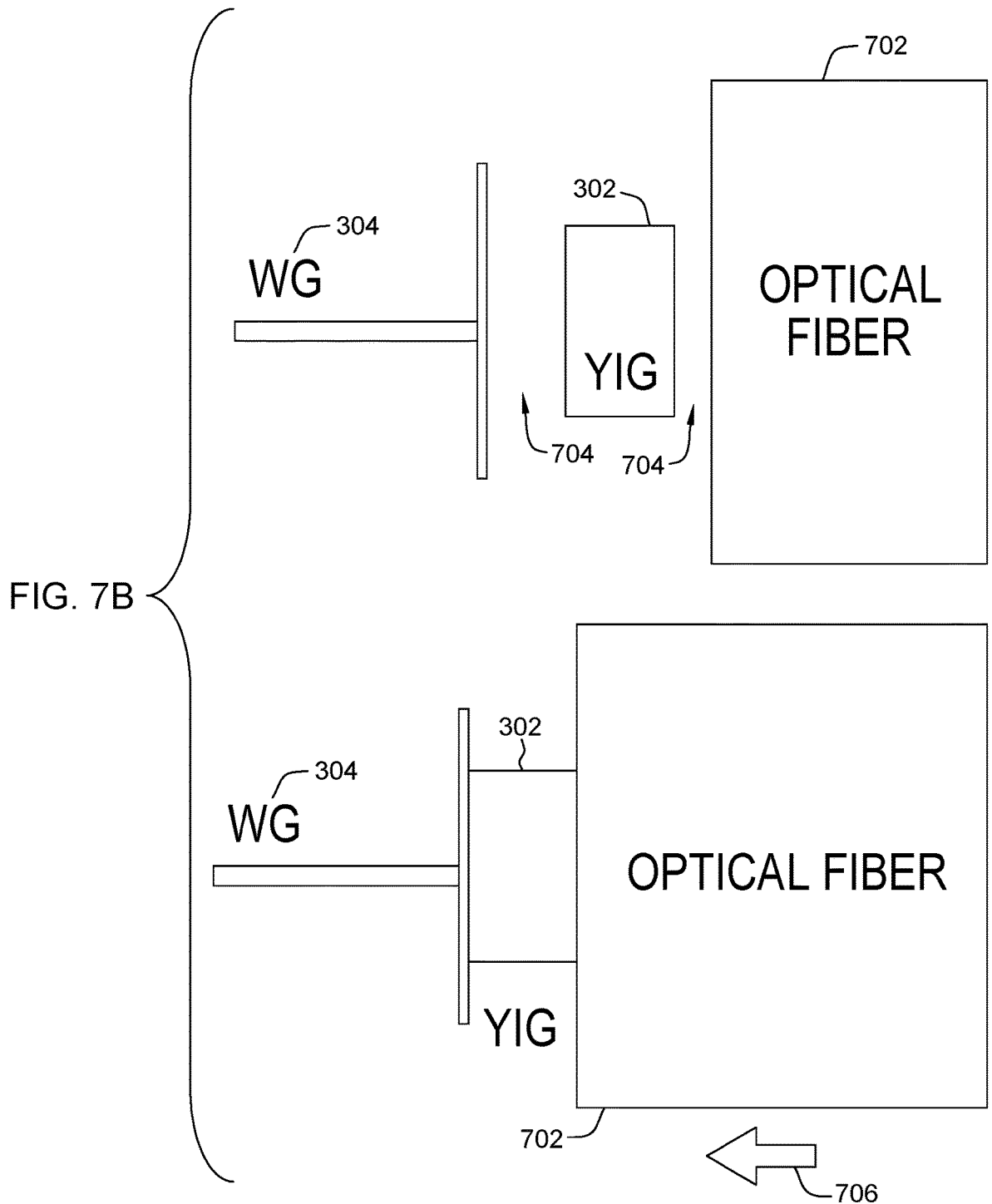

FIGS. 7A and 7B show coupling of the magneto-optical waveguide device of FIG. 3 with an optical fiber and external waveguide, in accordance with embodiments of the present invention. In this example, the magneto-optical isolator waveguide device 302 is situated between the external waveguide device 304 and an optical fiber 702. The optical fiber 702 (i.e., a glass fiber typically surrounded by one or more coating layers) may include an optical fiber core, which transmits and/or amplifies an optical signal, and an optical cladding, which confines the optical signal as guided mode. Accordingly, the refractive index of the core $n_c$ is typically greater than the refractive index of the optical cladding ng (i.e., $n_c$>$n_g$). In various embodiments, the optical fiber can be a single mode optical fiber and the magneto-optical waveguide device 302 may perform a function of a mode converter configured to convert energy from a first optical fiber guided mode to a second magneto-optical waveguide device guided mode, for example.

As shown in FIG. 7B, the optical fiber 702 can be pushed 706 to close the gap 704 between the optical fiber 702 and the magneto-optical waveguide device 302. One embodiment of the present invention relates to a packaging method which incorporates a photonic (optical) die in a three-dimensional (3D) die stack. Long-distance inter-die communication and intra-die communication may be carried on optical waveguides, such as external waveguide device 302, placed in an optical die that is configured in the 3D die stack. In one example, the optical fiber 702 may be configured to inject light signals into the photonic die via the magneto-optical waveguide device 302. In one embodiment, the magneto-optical waveguide device 302 may be a component of a PIC and may induce a non-reciprocal phase shift (NRPS) on optical signals traversing through the magneto-optical waveguide device 303 so that controlled constructive interference is formed when the optical signals are transmitted in a first direction and controlled destructive interference is formed on the input waveguide when the optical signals are transmitted in a second direction opposite to the first direction. The magneto-optical waveguide device 302 may be implemented as an integrated device and may be formed on a substrate, for example. In another embodiment, the patterned nanostructure and matching waveguide are made such that in forward direction the light is kept in the guided mode of the waveguide, while in the backward direction the light is focused outside of the guiding mode.

Figure 8:
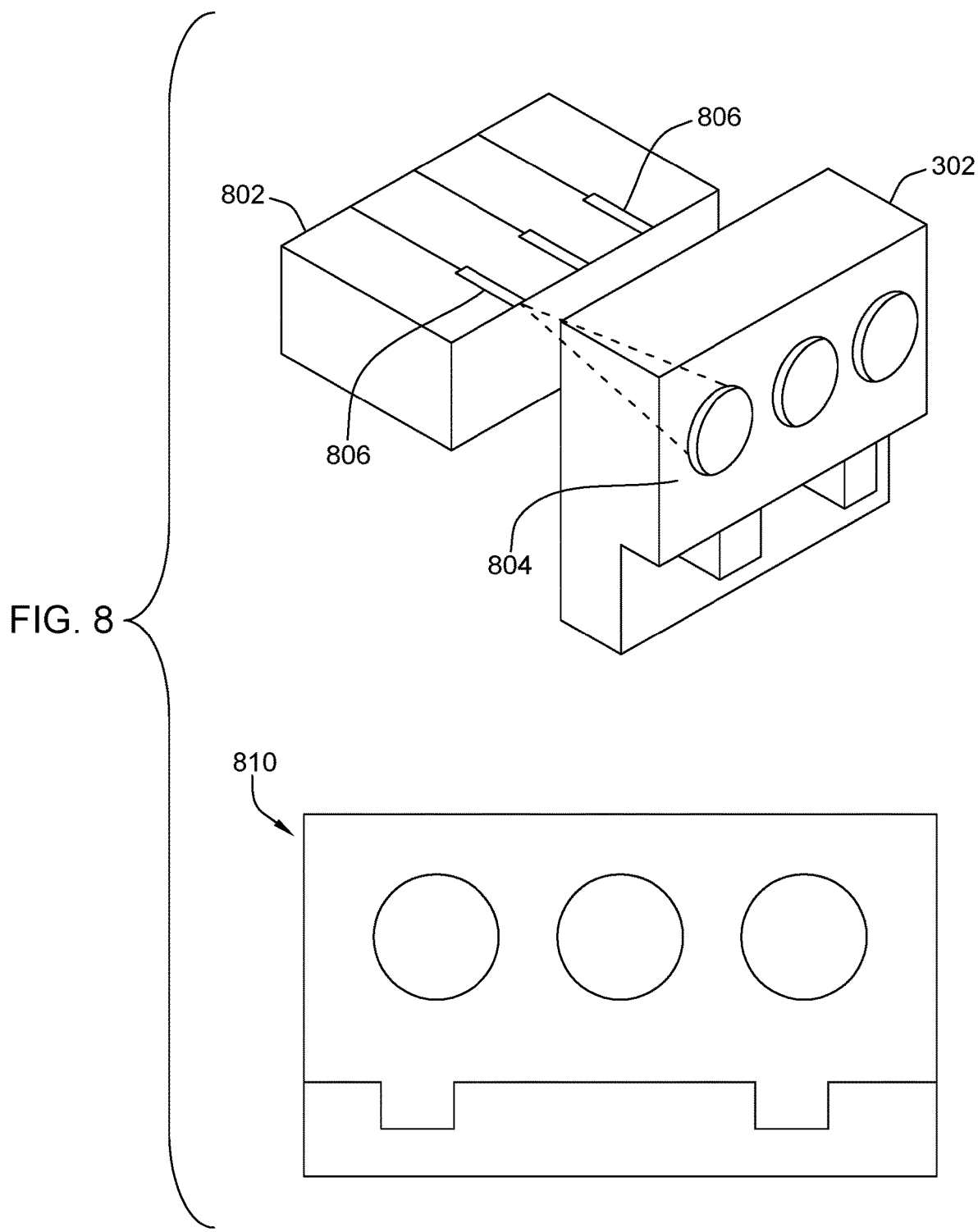
FIG. 8 shows a view of self-aligning magneto-optical waveguide device, in accordance with embodiments of the present invention.

FIG. 8 shows different views of a self-aligning magneto-optical waveguide device, in accordance with embodiments of the present invention. In this embodiment, the magneto-optical waveguide device 302 may include a coupling structure configured for self-aligned coupling with an optical device. In one embodiment, at least one surface of the magneto-optical waveguide device 302 may have a pattern of ridges 804 thereon. Accordingly, at least one face of the optical device 802 may have a corresponding pattern of openings or slots 806 creating a self-aligning connection system. At least in some embodiments, the geometry of the pattern of ridges 804 may be determined analytically. FIG. 8 further illustrates another view 810 of the magneto-optical waveguide device 302 coupled to the optical device 802.

FIG. 9A shows integrated optical waveguide circuits, in accordance with embodiments of the present invention. A first circuit 900a includes an optical waveguide input port 904 that delivers optical signals to a magneto-optical waveguide device 908a. The optical waveguide device 908a is integrated within the patterned nanostructure 902 and comprises a multimode interference (MMI) device. The optical waveguide device 908a is also coupled to an output port 906. Accordingly, optical signals travel from the input port 902 to the output port 906 through the first optical waveguide device 908a. The optical waveguide device 908a is positioned so that its axis is at 90° with respect to the incoming optical signals and is configured to defocus optical back reflections according to embodiments of the present invention. FIG. 9A further illustrates an alternative embodiment, where a second optical waveguide 908b integrated within the patterned nanostructure is positioned so that its axis is at an angle less than 90° with respect to the incoming optical signals. In one embodiment this angle may range between approximately 55° and 85°. In another embodiment, the patterned nanostructure in the magneto-optical device 908b is asymmetric. In yet another embodiment, the magneto-optical device 908b is a wedge. At least in some cases, the optical waveguide device 908b may provide more efficient focusing of the reflected optical signal outside of the incoming guiding mode to create an optical isolator. In other cases, ports are located to use the magneto-optical waveguide device 908b as a circulator. It should be noted that other polarization splitter/rotator(s) are not shown in the circuit.

FIG. 9B shows that the optical waveguide device 908a with the patterned nanostructure is configured to receive an input signal 910 via the input port 904 and provide a polarized output signal 912 having a desired polarization. Furthermore, the optical waveguide device 908a may be configured to generate phase impairment so that the reflected light 914 entering the output port 906 in the opposite direction is defocused away from the input port 904 to a different port 916. In other words, the patterned nanostructure and the optical waveguide 908a are made such that in forward direction the light is kept in the guided mode of the waveguide coupling to, while the optical backward direction, such as reflections, are focused outside of the guiding mode of the incoming coupling waveguide to create an optical isolator or are focused to the waveguide port 916 to create a circulator. It should be noted that other polarization splitter/rotator(s) are not shown in the circuit.

Figure 10A:
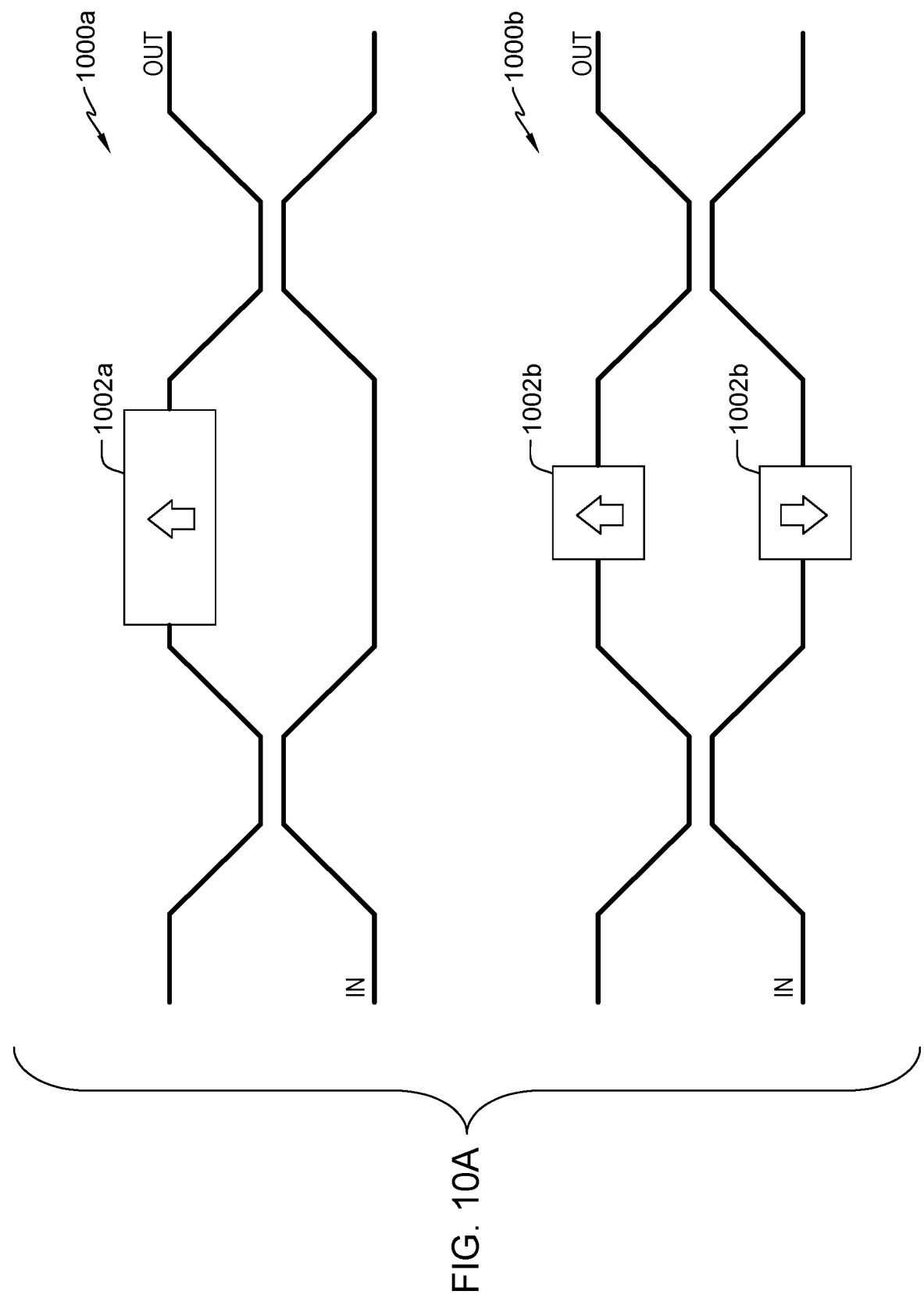
FIGS. 10A and 10B show the integrated optical waveguide circuit based on non-reciprocal phase shift, in accordance with embodiments of the present invention.
Figure 10B:
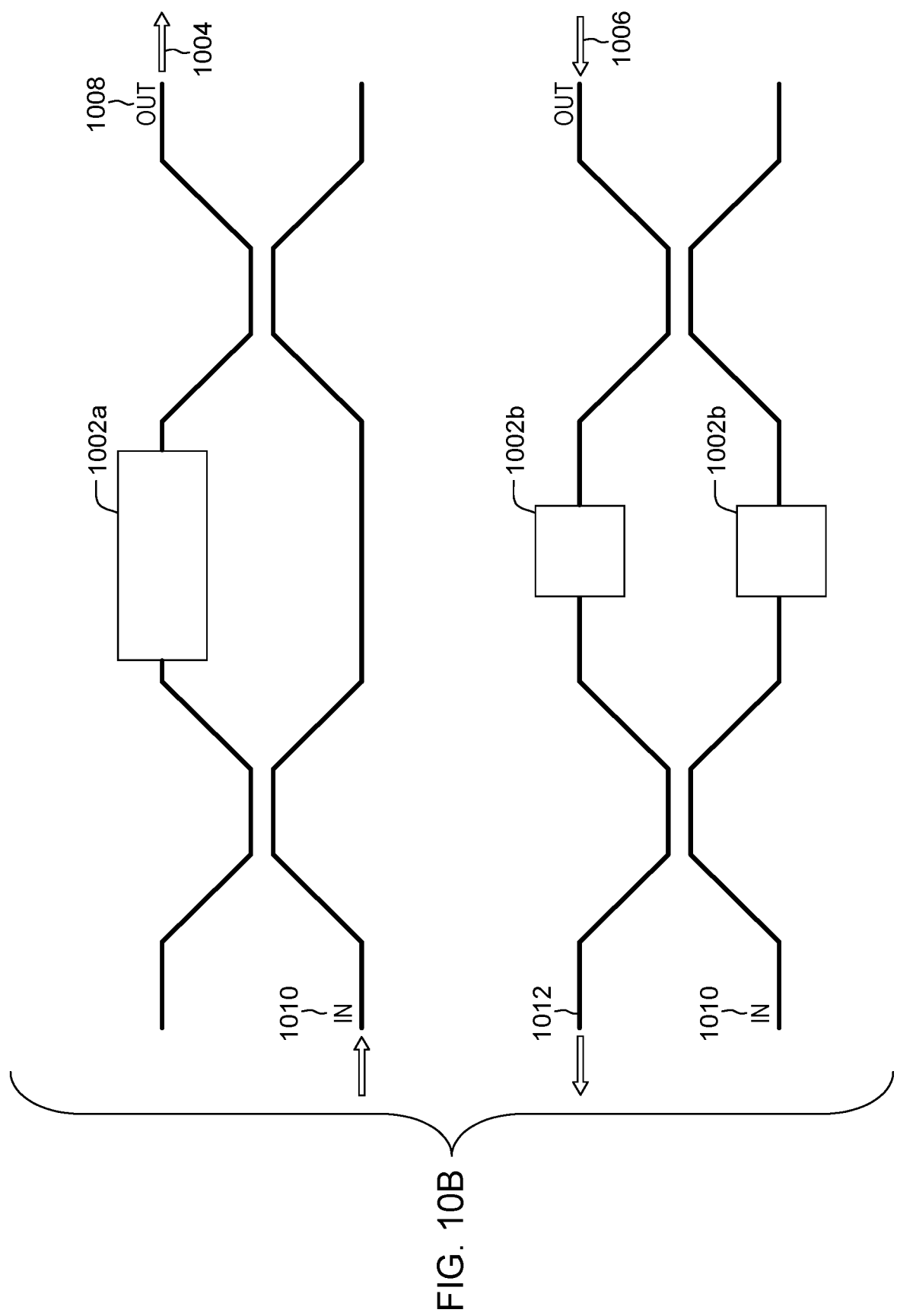

FIGS. 10A and 10B illustrate integrated optical waveguide circuits implemented as a non-reciprocal device. In such implementations, a magnetic field generated by the device gives rise to non-reciprocal phase shift (NRPS) in the optical circuit. The non-reciprocal phase shift leads to a difference in the way that a light signal travels in the forward and backward directions. FIG. 10A shows one embodiment where the circuit 1000a includes a magneto-optical patterned waveguide implemented in one branch 1002a of the device. The optical waveguide 1002a serves to create NRPS on optical back propagation. It should be noted that other polarization splitter/rotator(s) are not shown in the circuit 1000a. FIG. 10A further illustrates an alternative embodiment, where the circuit 1000b includes a magneto-optical waveguide 1002b that is implemented on the two branches of the NRPS device.

FIG. 10B illustrates that the magneto-optical waveguide 1002a is also configured to provide output signal 1004 at the output port 1008. Furthermore, the magneto-optical waveguide 1002a is configured to direct the reflected light 1006 entering the output port 1008 away from the input port 1010 to a different port 1012 to create an isolator or a circulator circuit.

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A magneto-optical waveguide device comprising:
an input port comprising first and second optical waveguide input ports;
an output port comprising an optical waveguide output port;
a magneto-optical crystal material to which the input port and the output port are coupled; and
a patterned nanostructure within the magneto-optical crystal material comprising an internal optical waveguide through the magneto-optical crystal material, wherein the patterned nanostructure modifies the refractive index of the magnetic-optical crystal material below diffraction limit and wherein the patterned nanostructure creates metamaterial effective properties that optimize core-cladding inside the magneto-optical crystal material to create the internal optical waveguide,
wherein:
a first signal propagating in a first direction and received by the first optical waveguide input port is transmitted through the internal optical waveguide to the optical waveguide output port,
a second signal propagating in a second direction opposite the first direction and received by the optical waveguide output port is transmitted through the internal optical waveguide to the second optical waveguide input port, and
the internal optical waveguide comprises a single multi-mode interference (MMI) device, which is immediately adjacent at opposite sides thereof to the input port and the outlet port, respectively.

2. The device of claim 1, wherein the patterned nanostructure is modified along the magneto-optical waveguide to create a mode converter configured to convert energy in a first guided mode to a second guided mode.

3. The device of claim 2, wherein the patterned nanostructure is modified to optimize coupling of the magneto-optical waveguide device to the first and second optical waveguide input ports and to the optical waveguide output port.

4. The device of claim 2, wherein the modified patterned nanostructure is modified to provide a birefringence effect for the magneto-optical waveguide device.

5. The device of claim 2, wherein the patterned nanostructure is modified to provide a graded-index lensing effect for the magneto-optical waveguide device.

6. The device of claim 1, wherein an internal optical waveguide comprises a mode converter to enhance efficiency of optical mode coupling.

7. The device of claim 1, wherein at least one surface of the input or output port comprises a coupling structure configured for self-aligned coupling with an optical device.

8. The device of claim 3, wherein a laser pulse is used to modify the refractive index of the patterned nanostructure locally to create a guiding condition while preserving an overall Verdet constant of the magneto-optical waveguide device.

9. An integrated optical waveguide circuit comprising:
first and second input optical waveguides;
an output optical waveguide; and
a magneto-optical waveguide device coupled to the first and second input optical waveguides and the output optical waveguide, the magneto-optical waveguide comprising a patterned nanostructure within a magneto-optical crystal material, wherein the magneto-optical waveguide device induces a non-reciprocal phase shift (NRPS) on optical signals traversing through the magneto-optical waveguide device and so that:
a first signal propagating in a first direction and received by the first input optical waveguide is transmitted through the magneto-optical waveguide device to the output optical waveguide, and
optical back reflections are directed from the output optical waveguide to the second input optical waveguide, and
wherein the magneto-optical waveguide comprises a single multimode interference (MMI) device, which is immediately adjacent at opposite sides thereof to the input port and the outlet port, respectively.

10. The circuit of claim 9, wherein the patterned nanostructure is modified to create a mode converter configured to convert energy in a first guided mode to a second guided mode.

11. The circuit of claim 9, wherein the patterned nanostructure is modified to provide a birefringence effect for the magneto-optical waveguide device.

12. The circuit of claim 9, wherein the magneto-optical waveguide device comprises a mode converter to enhance efficiency of optical mode coupling.

13. The circuit of claim 10, wherein the patterned nanostructure is modified to optimize coupling of the magneto-optical waveguide device to at least one of the first and second input optical waveguides and the output optical waveguide.

14. The circuit of claim 13, wherein a laser pulse is used to modify the refractive index of the patterned nanostructure locally to create a guiding condition while preserving an overall Verdet constant of the magneto-optical waveguide device.

15. A magneto-optical waveguide device comprising:
first and second optical waveguide input ports;
an optical waveguide output port; and
a patterned nanostructure within a magneto-optical crystal material comprising an internal optical waveguide, wherein the patterned nanostructure modifies the refractive index of the magnetic-optical crystal material below diffraction limit and creates metamaterial effective properties that optimize core-cladding inside the magneto-optical crystal material to create the internal optical waveguide,
wherein:
a first signal propagating in a first direction and received by the first optical waveguide input port is transmitted through the internal optical waveguide to the optical waveguide output port, and
a second signal propagating in a second direction opposite the first direction and received by the optical waveguide output port is transmitted through the internal optical waveguide to the second optical waveguide input port,
wherein the internal optical waveguide comprises a single multimode interference (MMI) device, which is immediately adjacent at opposite sides thereof to the input port and the outlet port, respectively.

* * * * *